Nov. 2, 1965 D. V. SYLVIA 3,214,982
FLOATED ROTOR FOR GYROSCOPES AND THE LIKE
Filed March 1, 1961
FIG. 1
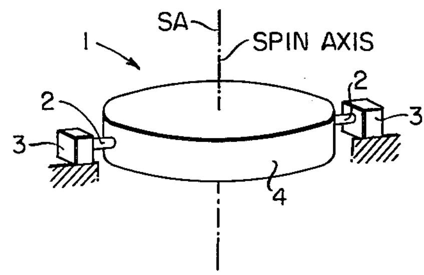
FIG. 2
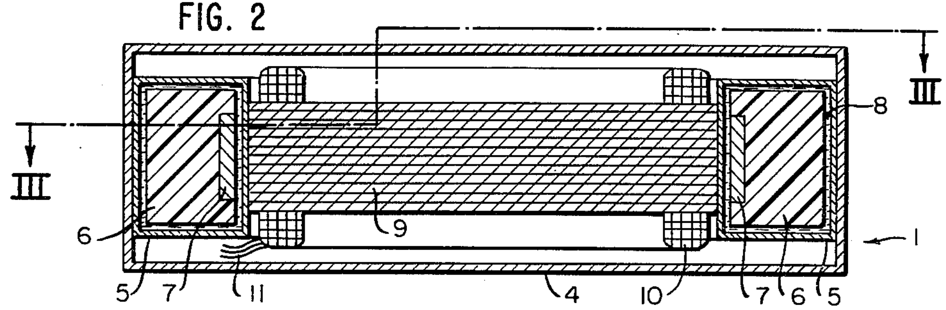
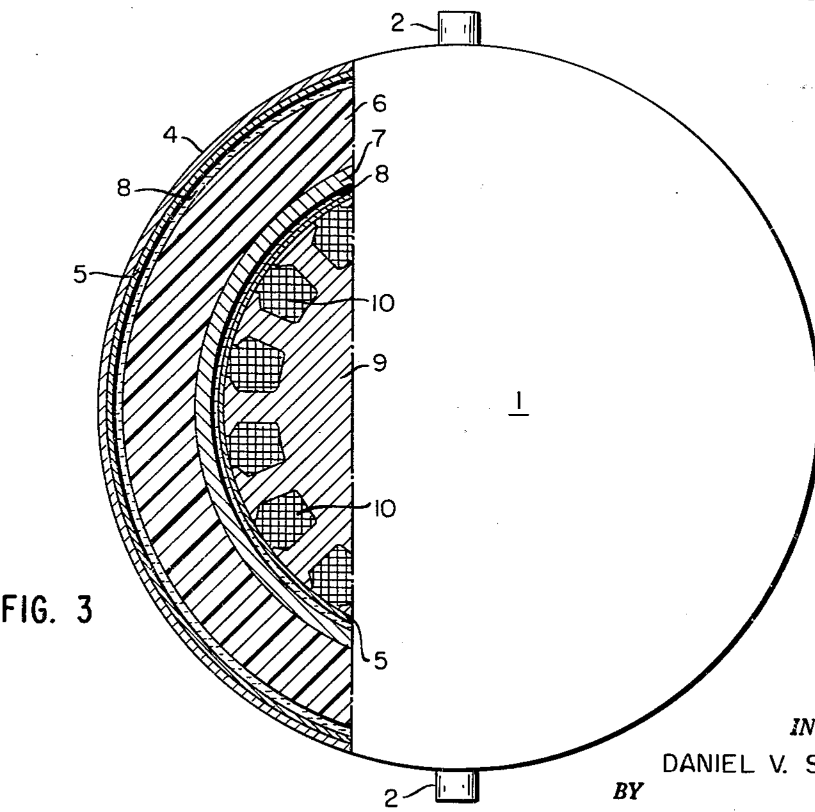
FIG. 3
INVENTOR.
DANIEL V. SYLVIA
BY
Kenway, Jenney + Hildreth
ATTORNEYS United States Patent Office 3,214,982
Patented Nov. 2, 1965

3,214,982

FLOATED ROTOR FOR GYROSCOPES AND THE LIKE

Daniel V. Sylvia, Norwood, Mass., assignor to Northrop Corporation, Beverly Hills, Calif., a corporation of California Filed Mar. 1, 1961, Ser. No. 92,612
5 Claims. (Cl. 74—5.7)

My invention relates to rotor constructions for gyroscopes and the like, and particularly to an improved floated rotor having a high degree of dynamic stability.

A major problem in the design and construction of gyroscopes is the necessity to minimize shifting of the center of mass of the rotating inertial element with respect to the case of the gimbal in which it revolves. In the past, efforts have been made to solve this problem by providing a stiff, isoelastic mounting based on ball or pivot bearings. Such bearings are complex and expensive, and are difficult to repair and maintain. Moreover, the bearing assemblies of which I am aware merely limit mass shifts, and have not been entirely satisfactory in preventing such shifts. It is the primary object of my invention to substantially eliminate mass shifts between a rotor and its support without the use of conventional bearings.

Briefly, my invention comprises a rotor in the form of a ring member disposed within a toroidal container which fits the ring with slight clearance on all sides. The clearance space is filled with a fluid. At least a part of the ring is made of ferromagnetic material, such that the ring can be caused to rotate in its container by the application of a rotating magnetic field disposed to sweep around the container. Preferably, the average density of the fluid is equal to the average density of the ring. In such a construction, the rotating ring is hydrodynamically centered, both axially and radially. In addition, the fact that the fluid and the ring are of the same density makes slight variations from a centered position of the ring unimportant, because the center of mass is not affected.

An important advantage of the novel construction of my invention is the ruggedness and simplicity of the rotor assembly. Since the parts required are few and simple, a gyroscope manufactured in accordance with my invention will be more economical to manufacture and maintain than gyroscopes in which complicated bearing assemblies are employed.

Other objects and further advantages of my invention will become apparent to those skilled in the art as the description proceeds.

My invention will best be understood by reference to the accompanying drawings, and the following detailed description, of a preferred embodiment thereof.

In the drawings,

FIG. 1 is a perspective sketch of a gyroscope in accordance with a preferred embodiment of my invention.

FIG. 2 is a cross-sectional elevational view of the gyroscope of FIG. 1 taken along a diameter normal to the axis of rotation; and FIG. 3 is a plan view, partly in cross section, of the gyroscope of FIG. 1, taken essentially along lines III—III in FIG. 2.

Referring now to the drawings, FIG. 1 shows a gyroscope 1 comprising an outer casing 4, constituting a gimbal, which may be provided with bearings 2 journalled in supports 3 in a conventional manner, as schematically indicated. Outer casing 4 encloses the novel rotor construction, to be described, which has an axis of rotation normal to the plane of the outer casing as indicated at SA in FIG. 1.

Referring now to FIGURES 2 and 3, outer casing 4 can be made of any suitable material such as metal or the like. Secured within casing 4 is a toroidal container 5, which may have a cross section of any desired shape. As shown, however, it is preferably of rectangular cross-section, having inner and outer cylindrical walls coaxial with the principal axis of casing 4, the latter being coincident with the spin axis SA. Container 5 can be made of any conventional non-conducting material such as glass, a ceramic, a plastic, or the like, which is adapted to be traversed by an electromagnetic field.

Within container 5, and shaped to conform with the container with slight clearances, which have been greatly exaggerated in the drawing for purposes of illustration, is an inertial member comprising a ring 7, of ferromagnetic material, and a ring 6, which can be of the same material or of a lighter material such as glass, plastic, ceramic or the like. In practice, the separation between the inertial member and the walls of the container at any point should be small, preferably of the order of 0.001–0.005 inch.

The spaces between the inertial member comprising rings 6 and 7 and the container 5 are filled by a fluid 8, which can be any desired inert and stable liquid. The density of the inertial member comprising rings 6 and 7 is preferably made equal to the density of the fluid, which can be accomplished, for example, in either of two ways. First, ring 7 will normally be made of a heavy material such as iron, nickel, cobalt or an alloy thereof, and in order to get the average density of the inertial member equal to that of the fluid, the ring 6 can be made of a light material such as a suitable plastic. Alternatively, rings 6 and 7 can be combined as one ring which is provided with internal voids to make its average density equal to that of the fluid.

Supported within, and attached to the outside of the inner wall of container 5, is an electromagnetic field generating means comprising a core member 9, of ferromagnetic material, provided with windings 10. Windings 10 are adapted to be energized by a polyphase source of voltage, not shown, which can be connected to external leads 11. Leads 11 may be brought out through outer case 4 in any conventional manner, suitable to the gyro type in which the novel wheel is the inertial member. Since means for making external electrical connections to a gimbaled member are known to the art and do not form a part of my invention, they have not been shown.

As shown in FIGS. 2 and 3, the windings 10 may be disposed in slots in the core member 9 in a conventional manner well known to the art, as is exemplified, for example, by the primary winding of a polyphase induction rotor, to provide a rotating magnetic field having at any instant a field vector directed radially through container 5 and sweeping the container cyclically at a predetermined rate. In a manner that will be well understood in the art, hysteresis effects in ring 7 will cause the inertial member to rotate, ultimately reaching a speed determined by the rate of rotation of the magnetic field, and slightly lagging the field due to friction between the ring, the fluid, and the inner walls of container 5. The ring will be centered, both axially and radially of container 5, by the hydro-dynamic forces set up in rotation. However, minor variations of any forces on the inertial member will not cause mass shifts in the gyroscope 1, since the average density of the inertial member comprising rings 6 and 7 is equal to that of the fluid 8.

While I have described only one embodiment of my invention in detail, many changes and variations will become apparent to those skilled in the art upon reading my description, and these can obviously be made without departing from the scope of my invention.

Having thus described my invention, what I claim is:

1. In combination, a container, an inertial rotor member within said container comprising a ferromagnetic ring secured to a ring of material, the dimensions of the inertial rotor member being slightly less than the inner dimensions of said container, a fluid having a density substantially equal to the average density of the inertial rotor member filling the interstices between the inertial rotor member and the container, and means for generating a rotating magnetic field positioned with respect to said container to cause said field to sweep said container to rotate said inertial rotor member.

2. In combination, a toroidal container having inner and outer coaxial and cylindrical walls, a toroidal inertial member composed at least in part of ferromagnetic material within said container and loosely filling said container with a small clearance in every dimension, a fluid filling the clearance between the member and the container, and means adjacent said container for generating a magnetic field rotating about the common axis of said walls and sweeping the interior of said container.

3. In combination; means for generating a magnetic field rotating about a reference axis; a toroidal container secured to said field generating means with its axis of generation coincident with said reference axis; an inertial mass comprising a ferromagnetic ring, said mass being located in, and shaped to conform with, said container and being slightly smaller than said container; and a fluid filling the interstices between said mass and said container.

4. In a gyrscope, a toroidal container having inner and outer coaxial cylindrical walls, a toroidal ring composed at least in part of ferromagnetic material, within said container, shaped to conform to said container, and being slightly smaller than said container, a fluid filling the interstices between said ring and said container, rotating field generating means mounted outside of said container on said inner wall for generating a field rotating about the common axis of said walls and sweeping said container to rotate said ring, and a housing enclosing said container and field generating means, said housing being pivotally mounted to a support for rotation about an axis normal to the axis of rotation of said ring.

5. A rotor assembly, comprising, in combination, a toroidal container, a ferromagnetic ring within said container and filling it with a small space on all sides, a fluid having a density equal to the density of the ring filling said space, and means for generating a magnetic field rotating about the axis of said container and traversing said container to rotate said ring.

References Cited by the Examiner

UNITED STATES PATENTS

| | | | |
|---|---|---|---|
| 2,785,573 | 3/57 | Bentley | 74—5.6 X |
| 2,898,765 | 8/59 | Atkinson et al. | 74—5.7 X |
| 2,966,803 | 1/61 | Johnston | 74—5 |
| 2,986,944 | 6/61 | Slater | 74—5.4 |
| 3,077,760 | 2/63 | Packard | 74—5.4 |

FOREIGN PATENTS

| | | |
|---|---|---|
| 150,452 | 9/20 | Great Britain. |

BROUGHTON G. DURHAM, *Primary Examiner.*